United States Patent
Toukoniitty et al.

(10) Patent No.: US 11,427,782 B2
(45) Date of Patent: Aug. 30, 2022

(54) PURIFICATION OF RECYCLED AND RENEWABLE ORGANIC MATERIAL

(71) Applicant: NESTE OYJ, Espoo (FI)

(72) Inventors: Blanka Toukoniitty, Porvoo (FI); Ville Paasikallio, Porvoo (FI); Jukka-Pekka Pasanen, Porvoo (FI); Jouni Touronen, Porvoo (FI); Meri Hovi, Porvoo (FI); Antti Pasanen, Porvoo (FI); Salla Likander, Porvoo (FI); Sami Toppinen, Porvoo (FI); Pekka Aalto, Porvoo (FI); Kari Jansson, Porvoo (FI); Marina Lindblad, Porvoo (FI); Mats Käldström, Porvoo (FI); Kaisa Lamminpää, Porvoo (FI)

(73) Assignee: NESTE OYJ, Espoo (FI)

( * ) Notice: Subject to any disclaimer, the term of this patent is extended or adjusted under 35 U.S.C. 154(b) by 0 days.

(21) Appl. No.: 17/261,743

(22) PCT Filed: Jul. 19, 2019

(86) PCT No.: PCT/EP2019/069490
§ 371 (c)(1),
(2) Date: Jan. 20, 2021

(87) PCT Pub. No.: WO2020/020769
PCT Pub. Date: Jan. 30, 2020

(65) Prior Publication Data
US 2021/0277324 A1    Sep. 9, 2021

(30) Foreign Application Priority Data
Jul. 20, 2018   (FI) ..................................... 20185652

(51) Int. Cl.
*C11B 3/00* (2006.01)
*C10G 3/00* (2006.01)
(Continued)

(52) U.S. Cl.
CPC ................ *C11B 3/001* (2013.01); *C10G 3/45* (2013.01); *C10G 3/46* (2013.01); *C10G 3/47* (2013.01);
(Continued)

(58) Field of Classification Search
None
See application file for complete search history.

(56) References Cited

U.S. PATENT DOCUMENTS 2,524,088 A   10/1950   Shaw
4,097,369 A    6/1978   Ebel et al.
(Continued)

FOREIGN PATENT DOCUMENTS

CA    894222 A      2/1972
CN    102786986 A   11/2012
(Continued)

OTHER PUBLICATIONS

Energy Fossil, Recovery of Navy Distillate Fuel from Reclaimed Product, Dennis W. Brinkman & Marwin L. Whisman (Published Nov. 1984).
(Continued)

*Primary Examiner* — Tam M Nguyen
(74) *Attorney, Agent, or Firm* — Buchanan Ingersoll & Rooney PC

(57) ABSTRACT

A method is disclosed of purifying a recycled or renewable organic material, wherein the recycled or renewable organic material contains more than 20 ppm Cl. Exemplary methods include (a) providing the recycled or renewable organic material; (b) purifying the organic recycled or renewable organic material to obtain a purified recycled or renewable organic material, and (c) hydrotreating the purified recycled or renewable organic material in a presence of a hydrotreating catalyst at a temperature from 270 to 380° C. under
(Continued)

pressure from 4 to 20 MPa and under continuous hydrogen flow; to obtain purified hydrotreated recycled or renewable organic material.

33 Claims, 2 Drawing Sheets

(51) Int. Cl.
  *C10G 67/14* (2006.01)
  *C11B 3/06* (2006.01)
  *C11B 3/10* (2006.01)

(52) U.S. Cl.
  CPC ............... *C10G 3/50* (2013.01); *C10G 67/14* (2013.01); *C11B 3/06* (2013.01); *C11B 3/10* (2013.01); *C10G 2300/1003* (2013.01); *C10G 2300/1007* (2013.01); *C10G 2300/1014* (2013.01); *C10G 2300/1018* (2013.01); *C10G 2300/202* (2013.01); *C10G 2300/4006* (2013.01); *C10G 2300/4012* (2013.01); *C10G 2300/4018* (2013.01)

(56) References Cited

U.S. PATENT DOCUMENTS

| | | | |
|---|---|---|---|
| 4,151,072 | A | 4/1979 | Johnson et al. |
| 4,160,725 | A | 7/1979 | Josis et al. |
| 4,241,227 | A | 12/1980 | Stonner et al. |
| 4,252,637 | A | 2/1981 | Knorre et al. |
| 4,328,128 | A | 5/1982 | Stanulonis et al. |
| 5,049,258 | A | 9/1991 | Keim et al. |
| 5,449,797 | A | 9/1995 | Estes et al. |
| 5,514,632 | A | 5/1996 | Chester et al. |
| 6,072,065 | A | 6/2000 | Chavet |
| 6,586,638 | B1 | 7/2003 | Zhang et al. |
| 9,347,178 | B2 | 5/2016 | Powell et al. |
| 9,353,478 | B2 | 5/2016 | Powell et al. |
| 9,382,483 | B2 | 7/2016 | Knuuttila et al. |
| 9,399,836 | B2 | 7/2016 | Powell et al. |
| 9,593,448 | B2 | 3/2017 | Powell et al. |
| 9,663,720 | B2 | 5/2017 | Nousiainen et al. |
| 9,688,919 | B2 | 6/2017 | Vilonen et al. |
| 9,932,530 | B2 | 4/2018 | Garg et al. |
| 10,023,810 | B2 | 7/2018 | Nousiainen et al. |
| 10,815,428 | B2 | 10/2020 | Nousiainen et al. |
| 2005/0101761 | A1 | 5/2005 | Lambert et al. |
| 2005/0240065 | A1 | 10/2005 | Blaschke et al. |
| 2006/0167291 | A1 | 7/2006 | Te et al. |
| 2007/0170091 | A1 | 7/2007 | Monnier et al. |
| 2008/0314799 | A1 | 12/2008 | Li et al. |
| 2009/0229172 | A1 | 9/2009 | Brady et al. |
| 2009/0250376 | A1 | 10/2009 | Brandvoid et al. |
| 2011/0138680 | A1 | 6/2011 | Dandeu et al. |
| 2012/0088943 | A1 | 4/2012 | Knuuttila et al. |
| 2012/0116134 | A1 | 5/2012 | Bozzano et al. |
| 2013/0072730 | A1 | 3/2013 | Knuuttila et al. |
| 2013/0090502 | A1 | 4/2013 | Laakkonen et al. |
| 2013/0158329 | A1 | 6/2013 | Brandvoid |
| 2013/0305598 | A1 | 11/2013 | Hamilton et al. |
| 2013/0345487 | A1 | 12/2013 | Baird et al. |
| 2014/0005451 | A1 | 1/2014 | Mezza et al. |
| 2014/0275666 | A1 | 9/2014 | Bauer et al. |
| 2015/0052807 | A1 | 2/2015 | Nousiainen et al. |
| 2015/0059354 | A1 | 3/2015 | Gutierrez et al. |
| 2015/0251168 | A1 | 9/2015 | Kettunen et al. |
| 2015/0361356 | A1 | 12/2015 | Garg et al. |
| 2016/0060540 | A1 | 3/2016 | Ouni et al. |
| 2016/0130509 | A1 | 5/2016 | Nousiainen et al. |
| 2016/0177188 | A1 | 6/2016 | Vilonen et al. |
| 2016/0177201 | A1 | 6/2016 | Pandranki et al. |
| 2016/0186067 | A1 | 6/2016 | Powell et al. |
| 2016/0257888 | A1 | 9/2016 | Nousiainen et al. |
| 2016/0289576 | A1 | 10/2016 | Eilos |
| 2017/0145318 | A1 | 5/2017 | Myllyoja et al. |
| 2017/0158967 | A1 | 6/2017 | Reiner et al. |
| 2019/0203154 | A1 | 7/2019 | Malm |
| 2020/0308505 | A1 | 10/2020 | Dayton et al. |
| 2021/0269722 | A1 | 9/2021 | Touronen et al. |
| 2021/0284925 | A1 | 9/2021 | Gao et al. |
| 2021/0292653 | A1 | 9/2021 | Touronen et al. |
| 2021/0292656 | A1 | 9/2021 | Touronen et al. |
| 2021/0292657 | A1 | 9/2021 | Toukoniitty et al. |
| 2021/0301210 | A1 | 9/2021 | Timken et al. |
| 2021/0332300 | A1 | 10/2021 | Timken |
| 2022/0135891 | A1 | 5/2022 | Toukoniitty et al. |

FOREIGN PATENT DOCUMENTS

| | | |
|---|---|---|
| CN | 106552611 A | 4/2017 |
| CN | 107636124 A | 1/2018 |
| CN | 107892990 A | 4/2018 |
| CN | 107974265 A | 5/2018 |
| CN | 107974266 A | 5/2018 |
| CN | 108251156 A | 7/2018 |
| EP | 0072873 A1 | 3/1983 |
| EP | 0420651 A1 | 4/1991 |
| EP | 0420652 A1 | 4/1991 |
| EP | 0574272 A2 | 12/1993 |
| EP | 1396531 A2 | 3/2004 |
| EP | 2149593 A1 | 2/2010 |
| EP | 2930231 A1 | 10/2015 |
| FI | 20135638 A | 12/2014 |
| JP | S5431484 B2 | 10/1979 |
| JP | H0940970 A | 2/1997 |
| JP | H1161148 A | 3/1999 |
| JP | 2000169862 A | 6/2000 |
| JP | 2003034794 A | 2/2003 |
| JP | 2003253038 A | 9/2003 |
| JP | 2007224196 A | 9/2007 |
| JP | 2009155475 A | 7/2009 |
| JP | 2010509472 A | 3/2010 |
| JP | 2011515539 A | 5/2011 |
| JP | 2013544304 A | 12/2013 |
| SE | 352373 B | 12/1972 |
| WO | 2008058664 A1 | 5/2008 |
| WO | 2012069467 A1 | 5/2012 |
| WO | 2013089838 A1 | 6/2013 |
| WO | 2013156683 A1 | 10/2013 |
| WO | 2014001632 A1 | 1/2014 |
| WO | 2015087938 A1 | 6/2015 |
| WO | 2015101713 A1 | 7/2015 |
| WO | 2016053948 A1 | 4/2016 |
| WO | 2018024728 A1 | 2/2018 |
| WO | 2018025103 A1 | 2/2018 |
| WO | 2018025104 A1 | 2/2018 |
| WO | 2018058172 A1 | 4/2018 |
| WO | 2018127812 A1 | 7/2018 |

OTHER PUBLICATIONS

Fats and Oils: Formulating and Processing for Applications, Third Edition By Richard D. O'Brien (2009).
Finnish Office Action dated Apr. 23, 2019 for Application No. 2185650.
International Preliminary Report on Patentability issued in corresponding International Patent Application No. PCT/EP2019/069474 dated Dec. 15, 2020.
International Preliminary Report on Patentability issued in corresponding International Patent Application No. PCT/EP2019/069482 dated Jan. 21, 2021.
International Preliminary Report on Patentability issued in corresponding International Patent Application No. PCT/EP2019/069490 dated Jul. 15, 2020.
International Preliminary Report on Patentability issued in corresponding International Patent Application No. PCT/EP2019/069497 dated Oct. 9, 2020.
International Preliminary Report on Patentability issued in corresponding International Patent Application No. PCT/EP2019/069503 dated Sep. 16, 2020.

(56) References Cited

OTHER PUBLICATIONS

International Preliminary Report on Patentability issued in corresponding International Patent Application No. PCT/EP2019/069512 dated Sep. 29, 2020.
International Search Report (PCT/ISA/210) and Written Opinion (PCT/ISA/237) dated Dec. 19, 2019, by the European Patent Office as the International Searching Authority for International Application No. PCT/EP2019/069503.
International Search Report (PCT/ISA/210) and Written Opinion (PCT/ISA/237) dated Dec. 5, 2019, by the European Patent Office as the International Searching Authority for International Application No. PCT/EP2019/069474.
International Search Report (PCT/ISA/210) and Written Opinion (PCT/ISA/237) dated Dec. 11, 2019, by the European Patent Office as the International Search Authority for International Patent Application No. PCT/EP2019/069482.
International Search Report (PCT/ISA/210) and Written Opinion (PCT/ISA/237) dated Sep. 10, 2019, by the European Patent Office as the International Searching Authority for International Application No. PCT/EP2019/069497.
International Search Report (PCT/ISA/210) and Written Opinion (PCT/ISA/237) dated Sep. 10, 2019, by the European Patent Office as the International Searching Authority for International Application No. PCT/EP2019/069512.
International Search Report (PCT/ISA/210) with translation and Written Opinion (PCT/ISA/237) dated Dec. 11, 2019, by the European Patent Office as the International Searching Authority for International Application No. PCT/EP2019/069490.
Punkkinen Henna et al., Research Report: "Thermal conversion of plastic-containing waste: A Review" (2017).
Search Report dated Apr. 9, 2019 by the Finnish Patent and Registration Office for Application No. 20185651.
Search Report dated Nov. 12, 2018 by the Finnish Patent and Registration Office for Application No. 20185651.
Search Report dated Nov. 19, 2018 by the Finnish Patent and Registration Office for Application No. 20185653.
Search Report dated Nov. 20, 2018 by the Finnish Patent and Registration Office for Application No. 20185654.
Search Report dated Nov. 21, 2018 by the Finnish Patent and Registration Office for Application No. 20185655.
Search Report dated Nov. 21, 2018 by the Finnish Patent and Registration Office for Application No. 2185650.
Search Report dated Nov. 6, 2018 by the Finnish Patent and Registration Office for Application No. 20185652.
Mohd Zin, Rohani Binti, et al., "Process Design in Degumming and Bleaching of Palm Oil", Centre of Lipids Engineering and Applied Research (CLEAR), Universiti Teknologi Malaysia, Nov. 2006, 239 pages.
Pyl, Steven P., et al., "Wood-derived olefins by steam cracking of hydrodeoxygenated tall oils", Bioresource Technology 126, 2012, pp. 48-55, Elsevier Ltd.
Sigot, L., et al., "Adsorption of octamethylcyclotetrasiloxane on silica gel for biogas purification", Fuel, Jul. 8, 2014, vol. 135, pp. 205-209.
Vogt, E.T.C., et al., "Fluid catalytic cracking: recent developments on the grand old lady of zeolite catalysis", Chem. Soc. Rev., Sep. 18, 2015, pp. 7342-7370, The Royal Society of Chemistry.
Office Action (Communication) dated Mar. 30, 2022, by the European Patent Office in corresponding European Patent Application No. 19742575.4. (8 pages).
Office Action (Opposition) dated Dec. 15, 2021, by the Finnish Patent Office in corresponding Finnish Patent Application No. FI 128911. (34pages).
Office Action dated Mar. 17, 2022, by the U.S. Patent Office in corresponding U.S. Appl. No. 17/261,679.
First Office Action dated Feb. 15, 2022, by the Chinese Patent Office in corresponding Chinese Patent Application No. 2019800484072, and an English Translation of the Office Action. (18 pages).
First Office Action dated Feb. 15, 2022, issued in the corresponding Chinese Patent Application No. 2019800477596, 15 pages including 6 pages of English Translation.
Search Report dated Mar. 24, 2022,issued in the corresponding Chinese Patent Application No. 2019800538354, 3 pages of official copy without English Translation.
Office Action dated Mar. 1, 2022, issued in the corresponding Japanese Patent Application No. 2021-502416, 4 pages including 2 pages of English Translation.
Office Action dated Mar. 1, 2022, issued in the corresponding Japanese Patent Application No. 2021-502417, 10 pages including 6 pages of English Translation.
Office Action dated Mar. 1, 2022, issued in the corresponding Japanese Patent Application No. 2021-502426, 5 pages including 3 pages of English Translation.
Office Action dated Mar. 8, 2022, issued in the corresponding Japanese Patent Application No. 2021-502928, 8 pages including 5 pages of English Translation.

PURIFICATION OF RECYCLED AND RENEWABLE ORGANIC MATERIAL

FIELD OF THE INVENTION

The present invention relates to a method of purifying recycled or renewable organic material, in particular recycled or renewable organic material comprising more than 20 ppm chlorine (Cl).

BACKGROUND OF THE INVENTION

In some cases recycled or renewable organic material contains organic oxygen and high amounts of chlorine (Cl). Before catalytic hydrotreating of the recycled or renewable organic material the chlorine needs to be removed from the material as it can generate hydrogen chlorine (HCl) which is known to cause corrosion to process equipment.

BRIEF DESCRIPTION OF THE INVENTION

An object of the present invention is thus to provide a method so as to overcome the above problems. The objects of the invention are achieved by a method which is characterized by what is stated in the independent claims. The preferred embodiments of the invention are disclosed in the dependent claims.

The invention is based on the surprizing realization that recycled or renewable organic material containing high amounts of chlorine (Cl) may be purified by a method that leads to removal of Cl from the recycled or renewable organic material as the recycled or renewable organic material is subjected to purification to remove Cl and to obtain a purified recycled or renewable organic material, and then hydrotreated in a presence of a hydrotreating catalyst at a temperature from 270 to 380° C. under pressure from 4 to 20 MPa and under continuous hydrogen flow to obtain purified hydrotreated recycled or renewable organic material. Advantageously the purified hydrotreated recycled or renewable organic material comprises less than 50%, preferably less than 30%, of the chlorine content of the recycled or renewable organic material before purification.

The method allows use of low quality recycled or renewable organic material feeds as a feedstock in hydrotreating, e.g. in processes producing high quality renewable fuels and/or chemicals.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
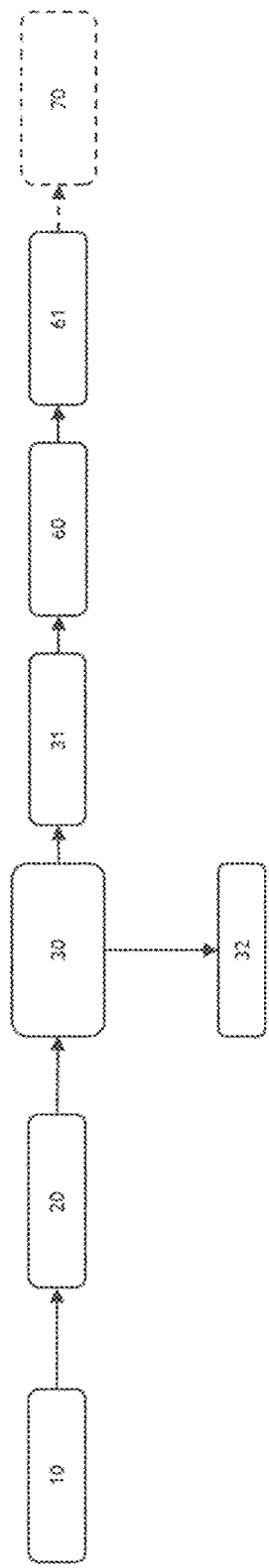
FIG. 1 illustrates a first exemplary process flow of the present method.

The present invention provides a method of producing purifying a recycled or renewable organic material.

The term "recycled or renewable organic material" refers to organic material, i.e. material containing carbon, obtained 1) from a natural resource which replenishes to overcome recourse depletion caused by its usage and consumption or 2) from a raw or processed material that is recovered from a waste for reuse. Herein the term "recycled or renewable organic material" in particular refers to organic material obtained from a raw or processed material that is recovered from a waste for reuse. The recycled or renewable organic material characteristically comprises aliphatic compounds having a carbon chain of from 4 to 30 carbon atoms, particularly from 12 to 22 carbon atoms. Typical examples of such aliphatic compounds are fatty acids or esters thereof, in particular wherein the fatty acids have an aliphatic chain of from 4 to 30 carbon atoms, more particularly from 12 to 22 carbon atoms. The recycled or renewable organic material typically comprises at least 50 wt % aliphatic compounds of the total weight of the recycled or renewable organic material.

Typically the recycled or renewable organic material refers to fats and/or oils of plant, algal, microbial and/or animal origin. It also refers to any waste stream received from processing of such oils and/or fats. The recycled or renewable organic material may be in an unprocessed form (e.g. animal fat), or a processed form (used cooking oil). The recycled or renewable organic material also refers to fossil waste-based oils and waste oils.

The term "plant based fats and oils" refers to fat and/or oils of plant origin i.e. oils that can originate directly from plants or they can be byproducts from various industrial sectors, such as agriculture or forest industry.

Examples of plant based fats and oils of the present invention include, but are not limited to, sludge palm oil, rapeseed oil, canola oil, colza oil, sunflower oil, soybean oil, hemp oil, olive oil, linseed oil, cottonseed oil, mustard oil, palm oil, arachis oil, castor oil and coconut oil.

Other examples of plant based fats and oils include biocrudes and bio oils. Biocrudes and bio oils are produced from biomass, in particular from lignocellulosic biomass, with various liquefying methods, such as hydrothermal liquefaction or pyrolysis, in particular fast pyrolysis.

The term "biocrude" refers to oils produced from biomass by employing hydrothermal liquefaction.

The term "bio oil" refers to pyrolysis oils produced from biomass by employing pyrolysis.

The term "biomass" refers to material derived from recently living organisms, which includes plants, animals and their byproducts.

The term "lignocellulosic biomass" refers to biomass derived from plants or their byproducts. Lignocellulosic biomass is composed of carbohydrate polymers (cellulose, hemicellulose) and an aromatic polymer (lignin).

The term "pyrolysis" refers to thermal decomposition of materials at elevated temperatures in a non-oxidative atmosphere.

The term "fast pyrolysis" refers to thermochemical decomposition of biomass through rapid heating in absence of oxygen.

The term "hydrothermal liquefaction" (HTL) refers to a thermal depolymerization process used to convert wet biomass into crude-like oil under moderate temperature and high pressure.

Examples of bio oil and biocrude produced from lignocellulosic biomass, e.g. materials like forest harvesting residues or byproducts of a saw mill, are lignocellulosic pyrolysis liquid (LPL), which is produced by employing fast pyrolysis and HTL-biocrude, which is produced by employing hydrothermal liquefaction.

Further examples of plant based fats and oils include crude tall oil (CTO), obtained as a by-product of the Kraft process (wood pulping), and its derivatives, such as tall oil pitch (TOP), crude fatty acid (CFA), tall oil fatty acid (TOFA) and distilled tall oil (DTO).

Crude tall oil comprises resin acids, fatty acids, and unsaponifiables. Resin acids are a mixture of organic acids derived from oxidation and polymerization reactions of terpenes. The main resin acid in crude tall oil is abietic acid but abietic derivatives and other acids, such as primaric acid are also found. Fatty acids are long chain monocarboxylic acids and are found in hardwoods and softwoods. The main fatty acids in crude tall oil are oleic, linoleic and palmitic acids. Unsaponifiables cannot be turned into soaps as they are neutral compounds which do not react with sodium hydroxide to form salts. They include sterols, higher alcohols and hydrocarbons. Sterols are steroids derivatives which also include a hydroxyl group.

The term "tall oil pitch (TOP)" refers to residual bottom fraction from crude tall oil distillation processes. Tall oil pitch typically comprises from 34 to 51 wt % free acids, from 23 to 37 wt % esterified acids, and from 25 to 34 wt % unsaponifiable neutral compounds of the total weight of the tall oil pitch. The free acids are typically selected from a group consisting of dehydroabietic acid, abietic and other resin acids. The esterified acids are typically selected from a group consisting of oleic and linoleic acids. The unsaponifiables neutral compounds are typically selected from a group consisting of diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of CTO.

The term "tall oil fatty acid (TOFA)" refers to fatty acid rich fraction of crude tall oil (CTO) distillation processes. TOFA typically comprises mainly fatty acids, typically at least 80 wt % of the total weight of the TOFA. Typically TOFA comprises less than 10 wt % rosin acids.

The term "distilled tall oil (DTO)" refers to resin acid rich fraction of crude tall oil (CTO) distillation processes. DTO typically comprises mainly fatty acids, typically from 55 to 90 wt %, and rosin acids, typically from 10 to 40 wt % rosin acids, of the total weight of the DTO. Typically DTO comprises less than 10 wt % unsaponifiable neutral compounds of the total weight of the distilled tall oil.

The term "animal based fats and oils" refers to fats and/or oils of animal origin i.e. lipid materials derived from animals. Examples of animal based fats and oils include, but are not limited to, such as suet, tallow, blubber, lard, train oil, milk fat, fish oil, poultry oil and poultry fat.

The term "microbial oils" refers to triglycerides (lipids) produced by microbes.

The term "algal oils" refers to oils derived directly from algae.

The term "fossil waste-based oils" refers to oils produced from waste streams like waste plastics or end-life-tires. Examples of fossil waste-based oils include waste plastic pyrolysis oil (WPPO) and end-life-tire pyrolysis oil (ELTPO).

The term "waste oils" refers to any oils that, through contamination, have become unsuitable for their original purpose due to the presence of impurities or loss of original properties. Examples of waste oils are used lubricant oils (ULO), hydraulic oils, transformer oils or oils used in metal working.

In the present invention the recycled or renewable organic material is typically selected from a group consisting of plant based fats and oils, animal based fats and oils, fossil waste-based oils, waste oils, algal oils and microbial oils.

Examples of the recycled or renewable organic material of the present invention include, but are not limited to, animal based oils and fats, vegetable or plant based oils and fats such as sludge palm oil, used cooking oil, microbial oils, algal oils, free fatty acids, any lipids containing phosphorous and/or metals, oils originating from yeast or mold products, oils originating from biomass, rapeseed oil, canola oil, colza oil, sunflower oil, soybean oil, hemp oil, olive oil, linseed oil, cottonseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria, tall oil, tall oil fatty acid TOFA), crude fatty acids (CFA), tall oil pitch (TOP), and any mixtures of said feedstocks.

In particular example the recycled or renewable organic material is selected from a group consisting of plant based fats and oils, animal based fats and oils, fossil waste-based oils, waste oils, algal oils and microbial oils; in particular from a group consisting of used lubricating oil (ULO), waste plastic pyrolysis oil (WPPO), and end-life-tire pyrolysis oil (ELTPO); more particularly the recycled or renewable organic material is WPPO, ELTPO or ULO.

The recycled or renewable organic material to be treated by the present method contains high amounts of chloride (Cl). Typically chloride is present in the form of chloride salts and/or organic chloride compounds, such as chlorinated hydrocarbons. The recycled or renewable organic material of the present invention comprises more than 20 ppm Cl, in particular more than 50 ppm Cl, more particularly from 50 to 1000 ppm Cl. Furthermore, the recycled or renewable organic material to be treated by the present method contains high amounts oxygen as organic oxygen compounds.

The recycled or renewable organic material to be treated by the present method may also comprise further impurities e.g. impurities comprising phosphorus and/or metals in the form of phospholipids, soaps and/or salts. The impurities may for example be in the form of phosphates or sulfates, iron salts or organic salts, soaps or phospholipids. The metal impurities that may be present in the biomass-based lipid material are for example alkali metals or alkali earth metals, such as sodium or potassium salts, or magnesium or calcium salts, or any compounds of said metals.

Accordingly provided herein is a method of purifying a recycled or renewable organic material, wherein the recycled or renewable organic material comprises more than 20 ppm Cl, comprising the steps of (a) providing the organic recycled or renewable organic material;

(b) purifying the organic recycled or renewable organic material to obtain a purified recycled or renewable organic material, and (c) hydrotreating the purified recycled or renewable organic material in a presence of a hydrotreating catalyst;

to obtain purified hydrotreated recycled or renewable organic material.

In step (b) the recycled or renewable organic material is purified to remove Cl from the organic recycled or renewable organic material. The purification step (b) may be accomplished by any purification method found suitable by a skilled person for separation of the volatiles from the heat treated recycled or renewable organic material. Suitable examples include, but are not limited to, subjecting the recycled or renewable organic material to alkaline metal hydroxide, such as lye, or adsorbent.

An applicable purification step (b) provides a purified recycled or renewable organic material, wherein the purified recycled or renewable organic material preferably comprises less than 20 ppm Cl.

For example (b1) the recycled or renewable organic material comprising more than 20 ppm Cl may be heated in the presence of an aqueous solution of alkaline metal hydroxide at a temperature from 100 to 450° C. to obtain the purified recycled or renewable organic material comprising less than 50% of the chlorine content of the recycled or renewable organic material provided in step (a).

In step (b1) the recycled or renewable organic material is heated to cause thermal reactions that degrade chloride containing impurities, in particular chlorinated organic hydrocarbons. The heat treatment of step (b1) takes place at any temperature from 100 to 450° C. For achieving optimal results, step (b1) is performed at from 150 to 400° C., preferably at from 200 to 300° C.

For (b1) the time during which the recycled or renewable organic material is heated and held at the desired temperature, i.e. residence time, is typically from 1 to 180 min, preferably from 2 to 90 min, more preferably from 5 to 60 min in step (b1).

The alkaline metal hydroxide is typically selected from a group consisting of KOH, LiOH, NaOH and mixtures thereof. The alkaline metal hydroxide is preferably NaOH. The concentration of the aqueous alkaline metal hydroxide is typically from 0.1 to 10.0 mol/L. The ratio of the aqueous solution of alkaline metal hydroxide to the treated recycled or renewable organic material in step (b1) is typically more than 0.1 g/g, preferably from 0.5 to 1.5 g/g.

After heating the organic and aqueous fractions may be separated by any suitable method known to a skilled person to obtain the purified recycled or renewable organic material comprising less than 50% of the chlorine content of the recycled or renewable organic material provided in step (a).

For another example (b2) the recycled or renewable organic material comprising more than 20 ppm Cl is heated in a presence of an adsorbent at a temperature from 100 to 450° C. and thereafter removing the solid adsorbent containing chloride impurities from the treated recycled or renewable organic material to obtain the purified recycled or renewable organic material, advantageously comprising less than 50% of the chlorine content of the recycled or renewable organic material provided in step (a).

In step (b2) the recycled or renewable organic material is heated in the presence of adsorbent to adsorb the chloride impurities to the adsorbent and to render the mixture separable. The heat treatment of step (b2) takes place at any temperature from 100 to 450° C. For achieving optimal results, step (b2) is performed at from 200 to 400° C., preferably at from 240 to 300° C.

For (b2) the time during which the recycled or renewable organic material is heated and held at the desired temperature, i.e. residence time, is typically from 1 to 180 min, preferably from 2 to 90 min, more preferably from 5 to 60 min in step (b2).

In an example of the step (b2), the heat treatment is performed as a batch process. In an alternative example of step (b2), the heat treatment is performed as a continuous process such as a guard bed. Advantageously LHSV is then from 0.1 to 10 1/h, preferably from 0.2 to 9 1/h, more preferably from 0.5 to 5 1/h in step (b2).

The adsorbent is typically selected from silica-based adsorbents. Preferably the adsorbent is trisyl silica. The adsorbent is alternatively selected from metal chlorides or metal oxides. The amount of adsorbent is typically from 0.1 to 10 wt %, preferably 0.5 to 2 wt %, of the total weight of the treated recycled or renewable organic material.

After the heat treatment in the presence of an adsorbent of step (b2) the solid adsorbent is removed. Removal of the solid adsorbent may be achieved for example by any separation method found suitable by a skilled person for separation of the solid material from the heat treated biomass-based lipid material. Suitable examples include, but are not limited to, filtration, centrifugation, and phase separation. It is also to be understood that several separation methods, e.g. filtration and centrifugation, may be combined. Preferably the removal is accomplished by filtration. The removal is preferably performed at any temperature from 100 to 180° C.

After the purification step (b) the purified recycled or renewable organic material is subjected to hydrotreatment in a presence of a hydrotreating catalyst to further remove Cl from the recycled or renewable organic material.

The term "hydrotreating" refers to a chemical engineer process in which reaction of hydrogen is used to remove impurities, such as oxygen, sulfur, nitrogen, phosphorous, silicon and metals, especially as part of oil refining.

Hydrotreating can be performed in one or several steps in one or more reactor units or catalyst beds.

Step (c) is typically achieved under continuous hydrogen flow. For achieving optimal results the continuous hydrogen flow is step (c) preferably has H2/feed ratio from 500 to 2000 n-L/L, more preferably from 800 to 1400 n-L/L.

In step (c) hydrotreatment is advantageously performed at a temperature from 270 to 380° C., preferably from 275 to 360° C., more preferably from 300 to 350° C. Typically the pressure in step (c) is from 4 to 20 MPa.

The hydrotreating catalyst is step (c) preferably comprises at least one component selected from IUPAC group 6, 8 or 10 of the Periodic Table. Preferably the hydrotreating catalyst in step (c) is a supported Pd, Pt, Ni, NiW, NiMo or a CoMo catalysts and the support is zeolite, zeolite-alumina, alumina and/or silica, preferably $NiW/Al_2O_3$, $NiMo/Al_2O_3$ or $CoMo/Al_2O_3$. In particular the hydrotreating catalyst is a sulfided NiW, NiMO or CoMo catalyst.

An applicable hydrotreatment step (c) provides a purified hydrotreated recycled or renewable organic material. The purified hydrotreated recycled or renewable organic material advantageously comprises less than 50%, preferably less than 30%, of the chlorine content of the recycled or renewable organic material provided in step (a).

For achieving optimal results part of the hydrotreated recycled or renewable organic material may be recycled in step (c). Preferably the ratio of the fresh feed i.e. purified recycled or renewable organic material obtained in step (b) to the recycled hydrotreated recycled or renewable organic material is from 2:1 to 20:1.

In a particular example the hydrotreatment is hydrodeoxygenation. In such example step (c) is typically performed by (c1) hydrodeoxygenating the purified recycled or renewable organic material in a presence of a HDO catalyst. This is preferably performed at a temperature from 275 to 360 C, more preferably from 300 to 350 C under pressure from 4 to 20 MPa and under continuous hydrogen flow.

The term "hydrodeoxygenation (HDO)" refers to removal of oxygen as water by the means of molecular hydrogen under the influence of a (HDO) catalyst.

The HDO catalyst may for example be selected from a group consisting of NiMO-, CoMo-, NiW-catalysts and any mixtures thereof. Preferably the HDO catalyst in step (c) is sulfided NiW, sulfided NiMO or sulfided CoMo-catalyst.

Advantageously, the continuous hydrogen flow has H2/feed ratio from 500 to 2000 n-L/L, preferably from 800 to 1400 n-L/L.

In another example step (c) is accomplished by (c2) hydrodesulfurizing (HSD) the heat treated recycled or renewable organic material fraction. The term "hydrodesulfurisation (HDS)" refers to removal of sulfur as hydrogensulfide by the means of molecular hydrogen under the influence of a (HDS) catalyst.

In another example step (c) is accomplished by (c3) hydrometaillizing (HDM) the heat treated recycled or renewable organic material fraction. The term "hydrodemetallization (HDM)" refers to removal of metals by trapping them with a (HDM) catalyst.

In another example step (c) is accomplished by (c4) hydrodenitrificating (HDN) the heat treated recycled or renewable organic material fraction. The term "hydrodenitrification (HDN)" refers to removal of nitrogen by the means of molecular hydrogen under the influence of a (HDN) catalyst.

In another example step (c) is accomplished by (c5) hydrodearomatizing (HDA) the heat treated recycled or renewable organic material fraction. The term "hydrodearomatisation (HDA)" refers to saturation or ring opening of aromatics by the means of molecular hydrogen under the influence of a (HDA) catalyst.

FIG. 1 illustrates a first exemplary process flow of the present method.

Referring to FIG. 1, a feed of recycled or renewable organic material, in particular tall oil pitch (TOP), 10 is subjected to heating 20 the recycled or renewable organic material in the presence of an aqueous solution of alkaline metal hydroxide as discussed herein for step (b1). The treated feed of recycled or renewable organic material is then separated 30 as discussed herein for step (b1) to obtain a purified recycled or renewable organic material 31 comprising less than 50% of the chlorine content of the feed (10) and an aqueous fraction 32 comprising the major part of Cl impurities. The purified recycled or renewable organic material is then hydrotreated 60, as discussed herein for step (c) to obtain a purified hydrotreated recycled or renewable organic material 61. The purified hydrotreated recycled or renewable organic material 41 may then be subjected to catalytic upgrading 70.

Figure 2:
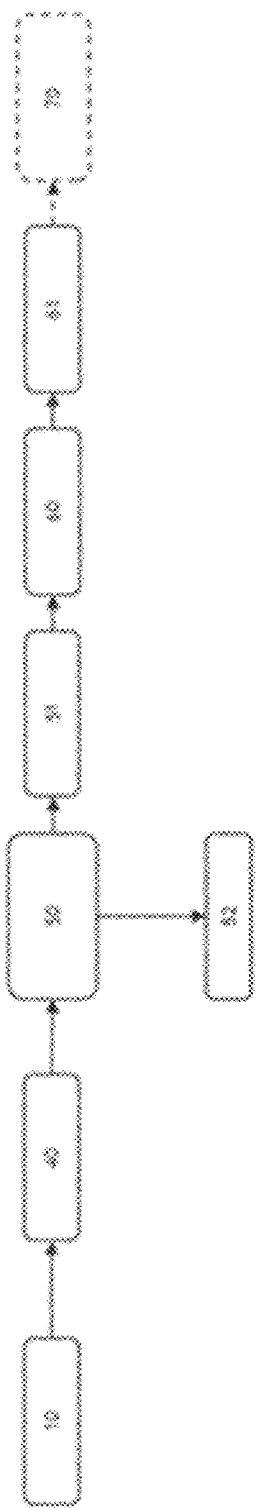
FIG. 2 illustrates a second exemplary process flow of the present method.

FIG. 2 illustrates a second exemplary process flow of the present method.

Referring to FIG. 2, a feed of recycled or renewable organic material, in particular tall oil pitch (TOP), 10 is subjected to heating 40 the recycled or renewable organic material the presence of adsorbent to adsorb the chloride impurities to the adsorbent and to render the mixture separable as discussed herein for step (b2). The adsorbent is then separated 50 from the treated feed of recycled or renewable organic material as discussed herein for step (b2) to obtain a purified recycled or renewable organic material 51 comprising less than 50% of the chlorine content of the feed (10) and an adsorbent 52 comprising the major part of Cl impurities. The purified recycled or renewable organic material is then hydrotreated 60, as discussed herein for step (c) to obtain a purified hydrotreated recycled or renewable organic material 61. The purified hydrotreated recycled or renewable organic material 61 may then be subjected to catalytic upgrading 70.

After the recycled or renewable organic material has been purified in accordance with the present method, it may be subjected to further processing e.g. catalytic upgrading. Such catalytic upgrading processes include, but are not limited to, catalytic cracking, thermo-catalytic cracking, catalytic hydrotreatment, fluid catalytic cracking, catalytic ketonization, catalytic esterification, or catalytic dehydration. Such processes require the recycled or renewable organic material to be sufficiently pure and free from impurities that may otherwise hamper the catalytic process or poison the catalyst(s) present in the process.

Accordingly the present invention further provides a process for producing recycled or renewable hydrocarbons, comprising steps of (x) producing hydrocarbons from a recycled or renewable organic material as discussed herein, and (y) subjecting the purified recycled or renewable organic material to an oil refinery conversion process, wherein the oil refinery conversion process comprises altering the molecular weight of the feed, removal of heteroatoms from the feed, altering the degree of saturation of the feed, rearranging the molecular structure of the feed, or any combination thereof to obtain at least one recycled or renewable hydrocarbon.

In a typical example of the present process the recycled or renewable hydrocarbon is a renewable traffic fuel or fuel component.

In an example of the present process, step (y) is hydrocracking. In such example, step (y) is preferably performed in a mild hydrocracking (MHC) refinery unit, in particular in a presence of a hydrocracking catalyst.

In another example of the present process, step (y) is steamcracking. In such example step (y) is preferably performed in a steamcracking unit.

In yet another example of the present process, step (y) is isomerization. In such example, step (y) is preferably performed in an isomerization unit.

After the recycled or renewable organic material has been purified in accordance with the present method, it may be subjected to further processing e.g. catalytic upgrading. Such catalytic upgrading processes include, but are not limited to, catalytic cracking, catalytic hydrocracking, thermocatalytic cracking, catalytic hydrotreatment, fluid catalytic cracking, catalytic ketonization, and catalytic esterification. Such processes require the recycled or renewable organic material to be sufficiently pure and free from impurities that may otherwise hamper the catalytic process or poison the catalyst(s) present in the process.

Accordingly the present invention further provides a process for producing a renewable traffic fuel or fuel component, comprising the steps of (x) purifying recycled or renewable organic material as discussed herein, and (y) hydrodeoxygenating (HDO) the purified recycled or renewable organic material to obtain a renewable traffic fuel or fuel component. Step (y) is preferably performed in a mild hydrocracking (MHC) refinery unit, in particular in a presence of an alumina based HDO catalyst.

EXAMPLES

Example 1

High Temperature NaOH Treatment of Waste Plastic Pyrolysis Oil

The following experiment was carried out in a 1-litre batch autoclave reactor. The waste plastic pyrolysis oil (340 g) and the 2 wt-% aqueous NaOH (227 g) were weighed together into the reactor vessel. After sealing and pressure testing, the reactor that was stirred at 500 rpm was heated to the desired reaction temperature of 240° C., which was then maintained for 30 min. The reactor was subsequently cooled down to room temperature before recovery of products. The contents were decanted from the reactor vessel into centrifugation tubes, and the liquids were centrifuged at 20° C. and 4300 rpm for 30 minutes. After the centrifugation, the purified pyrolysis oil was recovered as a separate layer, and analysed for its Cl, Br, S and N content. Cl, Br and S content was determined using X-ray fluorescence spectroscopy, and N content was determined according to standard ASTMD5762. The results, which are presented in Table 1, clearly show that the content of both Cl and Br decrease by more than 60%.

TABLE 1

Impurity content of waste plastic pyrolysis oil before and after 30 min treatment with 2 wt-% aqueous sodium hydroxide at 240° C.

|  | Original waste plastic pyrolysis oil | Purified waste plastic pyrolysis oil #1 | Decrease (%) |
| --- | --- | --- | --- |
| N (mg/kg) | 770 | 360 | 53 |
| Cl (mg/kg) | 625 | 187 | 70 |
| Br (mg/kg) | 307 | 111 | 64 |
| S (mg/kg) | 1000 | 911 | 9 |

It will be obvious to a person skilled in the art that, as the technology advances, the inventive concept can be implemented in various ways. The invention and its embodiments are not limited to the examples described above but may vary within the scope of the claims.

The invention claimed is:

1. A method of purifying a recycled or renewable organic material, wherein the recycled or renewable organic material contains more than 20 ppm chlorine, the method comprising:
   (a) providing the recycled or renewable organic material;
   (b) purifying the organic recycled or renewable organic material by (b1) heating the recycled or renewable organic material at a temperature of 200 to 300° C. in a presence of an aqueous solution of alkaline metal hydroxide to obtain a purified recycled or renewable organic material containing less than 50% of a chlorine content of the recycled or renewable organic material before provided in step (a); and
   (c) hydrotreating the purified recycled or renewable organic material in a presence of a hydrotreating catalyst;
   to obtain purified hydrotreated recycled or renewable organic material containing less than 50% of the chlorine content of the recycled or renewable organic material before provided in step (a).

2. A method as claimed in claim 1, wherein a residence time is selected to be at least one or more of from 1 to 180 min, or from 2 to 90 min, or from 5 to 60 min in step (b1).

3. A method as claimed in claim 1, wherein the alkaline metal hydroxide is selected from a group consisting of KOH, LiOH, NaOH and mixtures thereof.

4. A method as claimed in claim 1, wherein the concentration of the aqueous alkaline metal hydroxide is from 0.1 to 10.0 mol/L and a ratio of the aqueous solution of alkaline metal hydroxide to the treated recycled or renewable organic is selected to be at least more than 0.1 g/g, or from 0.5 to 1.5 g/g.

5. A method as claimed in claim 1, wherein step (b) performed by (b2) heating the recycled or renewable organic material in a presence of an adsorbent at a temperature from 100 to 450° C. and thereafter removing the adsorbent containing chloride impurities from the treated recycled or renewable organic material to obtain the purified recycled or renewable organic material.

6. A method as claimed in claim 5, wherein the residence time is selected to be at least one or more of from 1 to 180 min, or from 2 to 90 min, or from 5 to 60 min in step (b2).

7. A method as claimed in claim 5, wherein the step (b2) is performed as a batch process.

8. A method as claimed in claim 5, wherein the step (b2) is performed as a continuous process, as a guard bed.

9. A method as claimed in claim 8, wherein the LHSV is selected to be one or more of from 0.1 to 10 1/h, or from 0.2 to 9 1/h, or from 0.5 to 5 1/h in step (b2).

10. A method as claimed in claim 5, wherein the adsorbent is selected from silica-based adsorbents.

11. A method as claimed in claim 5, wherein the adsorbent is selected from metal chlorides or metal oxides.

12. A method as claimed in claim 5, wherein the amount of adsorbent is selected to be from 1 to 10 wt %, or 2 to 6 wt %, of a total weight of the treated recycled or renewable organic material.

13. A method as claimed in claim 1, wherein hydrotreating step (c) takes place under continuous hydrogen flow.

14. A method as claimed in claim 13, wherein in step (c) the continuous hydrogen flow has an H2/feed ratio selected to be from 500 to 2000 n-L/L, or from 800 to 1400 n-L/L.

15. A method as claimed in claim 1, wherein step (c) is performed at a temperature selected to be from 270 to 380° C., or from 275 to 360° C., or from 300 to 350° C.

16. A method as claimed in claim 1, wherein step (c) is performed under pressure from 4 to 20 MPa.

17. A method as claimed in claim 1, wherein the hydrotreating catalyst in step (c) contains at least one component selected from IUPAC group 6, 8 or 10 of the Periodic Table.

18. A method as claimed in claim 1, wherein the hydrotreating catalyst in step (c) is a supported Pd, Pt, Ni, NiW, NiMo or CoMo catalyst and the support is zeolite, zeolite-alumina, alumina and/or silica, $NiW/Al_2O_3$, $NiMo/Al_2O_3$ or $CoMo/Al_2O_3$.

19. A method as claimed in claim 1, wherein step (c) is accomplished by (c1) hydrodeoxygenating (HDO) the heat treated recycled or renewable organic material fraction.

20. A method as claimed in claim 19, wherein step (c) is accomplished by (c1) hydrodeoxygenating (HDO) the heat treated recycled or renewable organic material fraction in a presence of a HDO catalyst at a temperature from 270 to 380° C. under pressure from 4 to 20 MPa and under continuous hydrogen flow to obtain purified recycled or renewable organic material containing less than 50%, and/or less than 30% of an original chlorine content of the recycled or renewable organic material provided in step (a).

21. A method as claimed in claim 19, wherein step (c1) is selected to be performed at from 275 to 360° C., and/or from 300 to 350° C.

22. A method as claimed in claim 19, wherein in step (c1) the HDO catalyst is sulfided NiW, sulfided NiMO- or sulfided CoMo-catalyst.

23. A method as claimed in claim 19, wherein in step (c1) the continuous hydrogen flow has an H2/feed ratio selected to be from 500 to 2000 n-L/L, or from 800 to 1400 n-L/L.

24. A method as claimed in claim 1, wherein the recycled or renewable organic material is selected from a group consisting of plant based fats and oils, animal based fats and oils, fossil waste-based oils, waste oils, algal oils and microbial oils; from a group consisting of used lubricating oil (ULO), waste plastic pyrolysis oil (WPPO), and end-life-tire pyrolysis oil (ELTPO).

25. A process for producing recycled or renewable hydrocarbons, the method comprising:
   (x) producing hydrocarbons from a recycled or renewable organic material as claimed in claim 1; and
   (y) subjecting the purified recycled or renewable organic material to a oil refinery conversion process, wherein the oil refinery conversion process includes altering a molecular weight of the feed, removal of heteroatoms from the feed, altering a degree of saturation of the feed, rearranging the molecular structure of the feed, or any combination thereof to obtain at least one recycled or renewable hydrocarbon.

26. A process as claimed in claim 25, wherein step (y) is hydrocracking.

27. A process as claimed in claim 26, wherein step (y) is performed in a mild hydrocracking (MHC) refinery unit.

28. A process as claimed in claim 26, wherein step (y) is performed in a presence of a hydrocracking catalyst.

29. A process as claimed in claim 25, wherein step (y) is steamcracking.

30. A process as claimed in claim 25, wherein step (y) is isomerization.

31. A process as claimed in claim 25, wherein step (y) is hydrotreating.

32. A process as claimed in claim 25, wherein step (y) is thermal catalytic cracking.

33. A process as claimed in claim 25, wherein step (y) is fluid catalytic cracking.

\* \* \* \* \*